(12) United States Patent
Kim et al.

(10) Patent No.: US 6,586,752 B1
(45) Date of Patent: Jul. 1, 2003

(54) $CASO_4$ BASED THERMOLUMINESCENT DETECTOR BONDED WITH P-COMPOUND AND A METHOD FOR FABRICATING THEREOF

(75) Inventors: Jang-Lyul Kim, Taejon-si (KR); Si-Young Chang, Taejon-si (KR); Douying Jin, Taejon-si (KR); Jeong-Sun Yang, Cheju-do (KR); Young-Mi Nam, Taejon-si (KR); Jung-Il Lee, Taejon-si (KR)

(73) Assignee: Korea Atomic Energy Research Institute, Taejon-si (KR)

( * ) Notice: Subject to any disclaimer, the term of this patent is extended or adjusted under 35 U.S.C. 154(b) by 50 days.

(21) Appl. No.: 10/006,268

(22) Filed: Dec. 3, 2001

(30) Foreign Application Priority Data

May 3, 2001 (KR) ........................................ 2001-23926

(51) Int. Cl.[7] .................................................. G01T 1/11
(52) U.S. Cl. .................................................. 250/484.3
(58) Field of Search ................................. 250/484.3, 337

(56) References Cited

U.S. PATENT DOCUMENTS

| | | | | |
|---|---|---|---|---|
| 4,248,731 A | * | 2/1981 | Takenaga et al. | 250/484.3 |
| 4,512,911 A | * | 4/1985 | Kotera et al. | 250/484.3 |
| 4,839,518 A | * | 6/1989 | Braunlich et al. | 250/337 |
| 5,130,549 A | * | 7/1992 | Davies et al. | 250/484.3 |
| 5,177,363 A | * | 1/1993 | Velbeck et al. | 250/484.3 |
| 5,196,704 A | * | 3/1993 | Miller | 250/484.3 |
| 5,622,659 A | * | 4/1997 | Spicuzza | 264/21 |
| 5,656,815 A | * | 8/1997 | Justus et al. | 250/337 |

OTHER PUBLICATIONS

An article entitled "Preparation and Performance of a CaSO4:Dy, Tm Thermoluminescent Phospor For LongTerm Gamma Measurements," By Azorin et al., published by Health Physics, vol. 56, No. 4, Apr., pp. 551–559, 1989.

An article entitled "Some Thermoluminescent Properties of a New Preparation of CaSO4:Dy Phosphor," By Furetta et al., published by Pregamon Journals Ltd., vol. 37, No. 9, pp. 935–939, Feb. 17, 1986.

* cited by examiner

Primary Examiner—Christopher W. Fulton
(74) Attorney, Agent, or Firm—Bachman & LaPointe, P.C.

(57) ABSTRACT

Disclosed are a $CaSO_4$ based TL detector bonded with phosphorous compound and a method for fabricating thereof. The $CaSO_4$ based TL detector can be fabricated by mixing $CaSO_4$ based TL powder with a phosphorous precursor; molding the mixture powder under pressure; and sintering the molded body. The TL detector has so high TL sensitivity as to effectively measure personnel dose equivalent and low dose detection. It can be also manufactured in various forms and is easily handled, finding numerous applications in personnel and environmental monitoring fields.

9 Claims, 11 Drawing Sheets

(a)

(b)

CASO$_4$ BASED THERMOLUMINESCENT DETECTOR BONDED WITH P-COMPOUND AND A METHOD FOR FABRICATING THEREOF

FIELD OF THE INVENTION

The present invention relates to accurate radiation dosimetry in personnel and environmental monitoring. More particularly, the present invention relates to a CaSO$_4$ based thermoluminescent (TL) detector bonded with a phosphorous compound and a method for fabricating thereof.

BACKGROUND OF THE INVENTION

Typically represented by a thermoluminescent dosimeter (TLD) and a film badge, personnel dosimeters are useful for measuring of radiation dose equivalent to the human body.

When TLD is irradiated with radiation (e.g., X-ray, γ ray, β ray, etc.) and then heated, electrons captured in traps are excited to the conduction band. In the conduction band, the electrons migrate and recombine with trapped holes which are recombination centers, thereby releasing the energy as thermoluminescence, in which the amount of the luminescence is proportional to the radiation dose irradiated to TL material. The TLD can be measured very accurately over a broad range of $10^{-6} \sim 10^3$ Gy, and pelletized to any size and form as desired. Therefore, the TLD is extensively used for radiation monitoring, finding numerous applications in personnel and environmental monitoring, radiotherapy and urgent environmental radioactive management [M. Oberhofer and A. Scharmann, *Applied Thermoluminescence Dosimetry*, Adam Hilger Ltd., Bristol 1981; R. Chen and Y. Kirsh, *Analysis of Thermally Stimulated Processes*, Pregamon Press, Oxford, 1981].

Meanwhile, the film badge is based on photosensitization of film by radiation. The radiation amount absorbed is determined by developing and measuring the darkness of the sensitized film. The film badge has the advantage of permanently preserving record of measuring the exposed radiation dose, but suffers from the disadvantage of substantial fading due to temperature and humidity fluctuations of the environment and being poor in radiation sensitivity. For these reasons, film badges are now replaced with TLD badges. Active research has been directed to the applications of TLD and the development of novel TL materials of high TL sensitivity in United States, United Kingdom and Japan [R. M. Hall and C. N. Wright, *Health Phys.*, Pergamon Press, 1968, 14, 37–40; G. Cai, K. Geng, Q. Wang, *Radiat. Prot. Dosim.*, 1995, 60, 259–262].

TLD materials are classified into two categories: tissue equivalent TL material, such as LiF, Li$_2$B$_4$O$_7$ and MgB$_4$O$_7$, having effective atomic numbers similar to air ($Z_{eff}$=7.64) or human tissue ($Z_{eff}$=7.42); and non-tissue equivalent TL material (CaSO$_4$, and CaF$_2$) similar in atomic number to bone ($Z_{eff}$=14). Interacting with photons similar to human tissue the tissue equivalent TL material is favorable in measuring personnel dose equivalent. However, it has the disadvantage of lower TL sensitivity, compared with the non-tissue equivalent TL material. On the other hand, the non-tissue equivalent TLD is of such high TL sensitivity as to measure very low dose, such as environmental radiation. However, the non-tissue equivalent TLD for use in measurement of personnel dose equivalent requires an additional filter for energy dependence compensation because of high-energy response to photons.

ICRP 60 recommendations [ICRP, 1990 *Recommendations of the International Commission on Radiological Protection*, ICRP Publication 60, Pergamon Press, Oxford, N.Y., 1990] require that the dose is maintained as low as reasonably achievable (ALARA) for limiting stochastic effects based on the hypothesis of linear non-threshold. In order to maintain the ALARA dose, more accurate dose measurements should be conducted in the low dose range of $10^{-7}$ to $10^{-4}$ Gy. To this end, higher sensitivity TL materials or higher sensible dosimetric systems are needed. Suitable for this purpose is the CaSO$_4$:Dy TL material. However, the detectors cannot be manufactured by use of CaSO$_4$:Dy TL powders alone. For the preparation of detectors, the powders are contained in capsules or specific containers, or mixed with Teflon. The CaSO$_4$:Dy TL detector mixed with Teflon does not show high TL sensitivity which is the major advantage of CaSO$_4$:Dy powders, because of low content (15~30 wt %) of CaSO$_4$:Dy powders on the basis of the total weight of the detector.

For wider applications of powdered CaSO$_4$:Dy TL materials, there is a widely recognized need for a solidified CaSO$_4$:Dy TL detector. Research for pelletizing CaSO$_4$:Dy TL materials has been continuously carried out [D. R. Vij, *Thermoluminescent Materials*, 142–179, PTR Prentice-Hall, New Jersey, 1993; G. A. M. Webb J. E. Dauch and G. Bodin., Operational evaluations of a new high intensity thermoluminescent dosimeter, *Health Phys.*, 1972, 23, 89–94; A. M. P. L. Fordon and R. Muccillo, Thermal neutron detection by activation of CaSO$_4$:Dy+KBr thermoluminescent phosphor, Int. *J. Appl. Radiat. Isot.*, 1979, 30, 571–573; S. P. Morata, A. M. P. Gordon, E. N. D. Santos, L. Gomes, L. L. Compos, L. Prado, M. M. F. Vieira and V. N. Bapat, Development of a state dosimeter based on thermoluminescent CaSO$_4$:Dy crystals *Nucl. Istrum. Methods*, 1982, 200, 449–455; M. Prokic, Improvement of the thermoluminescence properties of the non-commercial dosimetry phosphors CaSO$_4$:Dy and CaSO$_4$:Tm, *Nucl. Instrum. Methods*, 1978, 151, 603–608; S. S. Shastry, S. S. Shinde and R. C. Bhatt, Thermoluminescence response of CaSO$_4$:Dy sintered pellets, Int. *J. Radiat. Isot.* 31. 1980, 4, 244–245; M. Prokic, Thermbluminescent characteristics of calcium sulphate solid detectors, *Radiat. Prot. Dosim.*, 1991, 37, 271–274]. Generally, pelletizing TL materials can be achieved with TL powders alone or in combination with a suitable binder. When pure CaSO$_4$:Dy powders are molded under pressure and then sintered, the resulting pellet is difficult to use as a detector because of its low bonding strength. In the case of pure CaSO$_4$:Dy TL materials, however, no better alternatives have been developed yet. Hence, Teflon is widely used for pelletizing CaSO$_4$:Dy TL powders [G. A. M. Webb, J. E. Dauch and G. Bodin. Operational evaluations of a new high intensity thermoluminescent dosimeter, *Health Phys.*, 1972, 23, 89–94]. The CaSO$_4$:Dy detector using Teflon as a binder has such a Teflon content of as high as 70–85 wt % that its TL sensitivity is poor as mentioned above. What is worse, Teflon is vulnerable to heat.

In addition, use of KBr, NaCl and Mg$_3$(BO$_3$)$_2$ as binders in preparing CaSO$_4$:Dy-based TLD has been studied [A. M. P. L. Fordon and R. Muccillo, Thermal neutron detection by activation of CaSO$_4$:Dy+KBr thermoluminescent phosphor, Int. *J. Appl. Radiat. Isot.* 1979, 30, 571–573; S. P. Morata, A. M. P. Gordon, E. N. D. Santos, L. Gomes, L. L. Compos, L. Prado, M. M. F. Vieira and V. N. Bapat, Development of a state dosimeter based on thermoluminescent CaSO$_4$:Dy crystals *Nucl. Istrum. Methods* 1982, 200, 449–455; M. Prokic, Improvement of the thermoluminescence properties of the non-commercial dosimetry phosphors CaSO$_4$:Dy and CaSO$_4$:Tm, *Nucl. Instrum. Methods*, 1978, 151, 603–608; S. S. Shastry, S. S. Shinde and R. C. Bhatt, Thermoluminescence response of CaSO$_4$:Dy sintered pellets, Int. *J. Radiat. Isot.* 1980, 31. 4, 244–245]. However, none of the detectors using the above binders are higher in TL sensitivity, compared to Teflon-embedded detectors. Another developed example is a CaSO$_4$:Dy TL detector using multi component inorganic binding substance in a small quantity [M. Prokic, Thermoluminescent characteristics of calcium sulphate solid detectors, *Radiat. Prot. Dosim.*, 1991, 37, 271–274]. Also in South Korea, CaSO$_4$:Dy materials are under study and a CaSO$_4$:Dy TL detector mixed with Teflon was developed [Choi Tae-Jin, Kim Do-Sung, Do Shi-Hong, La Byung-Ook, Kang Young-Ho, CaSO$_4$:Dy thermoluminescent dosimeter preparation and physical properties, *New Physics* 1986, 26(6) 506–512].

SUMMARY OF THE INVENTION

Aiming to solve the above problems, much effort was made by the present inventors to develop a novel TL detector.

It is found that a phosphorous precursor can be converted into a suitable binder when being molded under pressure and sintered, together with CaSO$_4$ based TL powders, and the resulting TL detector can be manufactured in various forms in addition to exhibiting high TL sensitivity and excellent mechanical properties.

Accordingly, it is an object of the present invention to provide solidified TL detectors of high TL sensitivity.

It is another object of the present invention to provide a method for fabricating novel CaSO$_4$ based TL radiation detectors with a phosphorous compound acting as a binder.

In accordance with an embodiment of the present invention, there is provided a CaSO$_4$ based TL detector, containing a phosphorous compound as a binder.

In accordance with another embodiment of the present invention, there is provided a method for fabricating a CaSO$_4$ based TL detector, comprising the steps of: mixing CaSO$_4$ based TL powder with a precursor of phosphorous compound; molding the mixture powder under pressure; and sintering the molded body.

BRIEF DESCRIPTION OF THE DRAWINGS

The above and other objects, features and other advantages of the present invention will be more clearly understood from the following detailed description taken in conjunction with the accompanying drawings, in which.

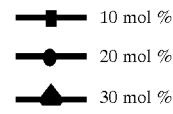

Figure 10:
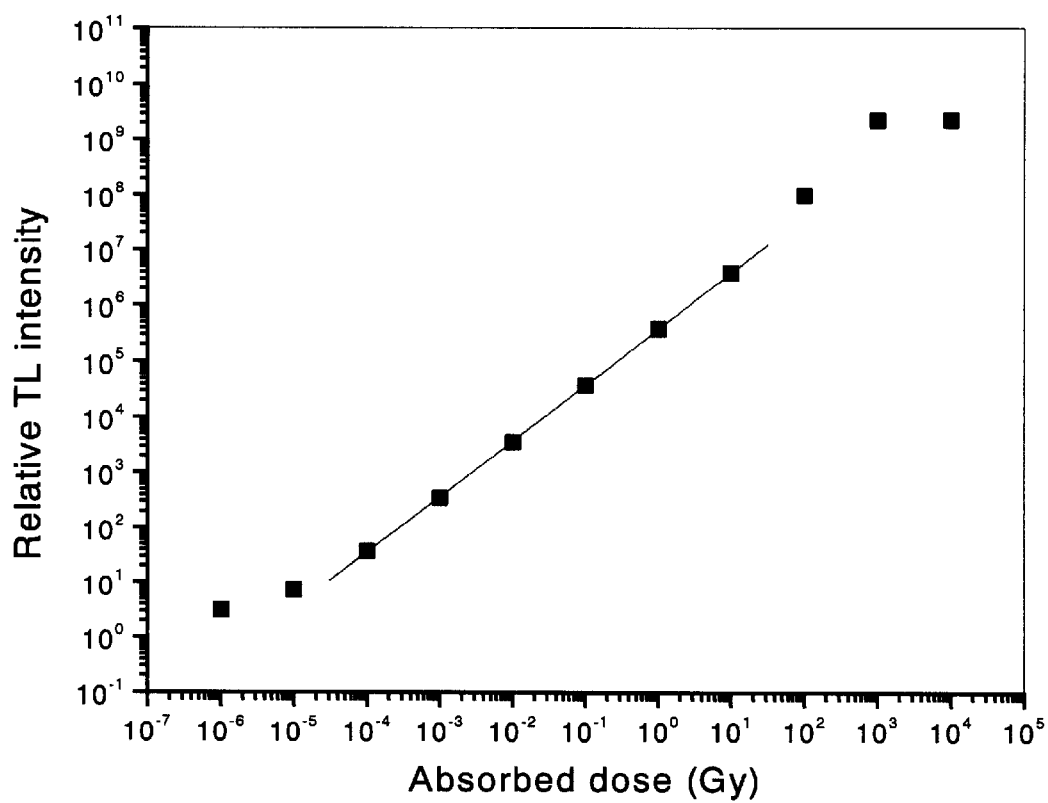

FIG. 10 shows a graph illustrating dose dependence of the TL detector of the present invention.

Figure 11:
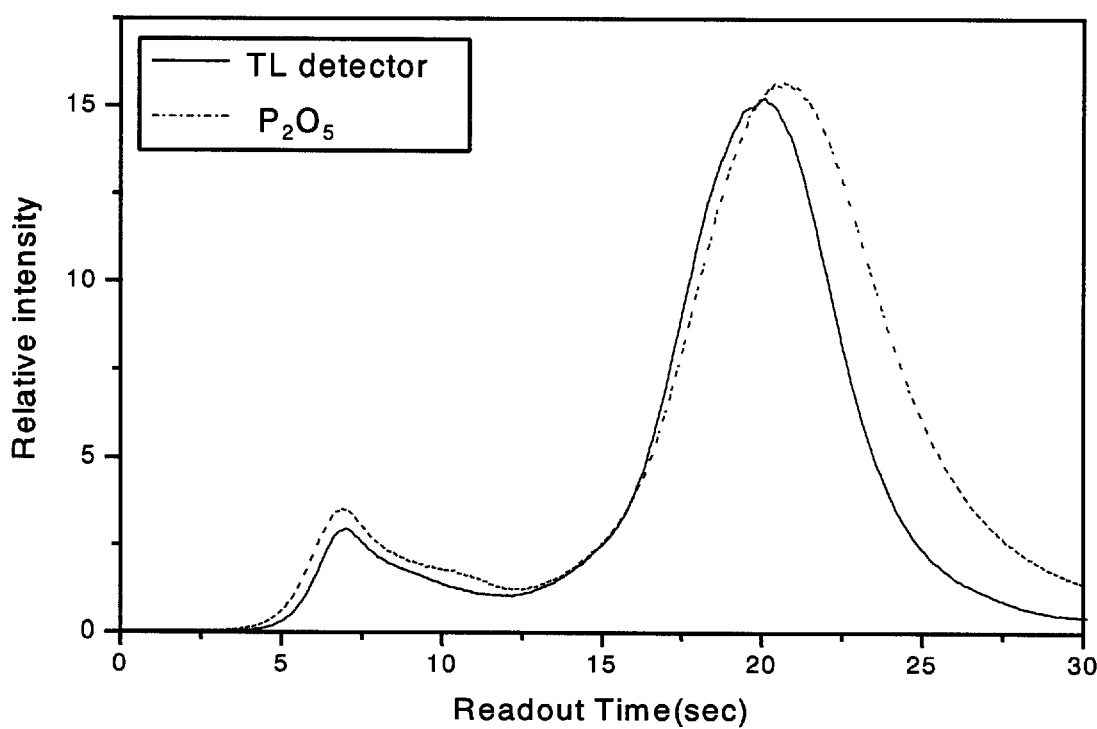

FIG. 11 shows a graph comparing TL intensities of the TL detectors comprising NH$_4$H$_2$PO$_4$ and P$_2$O$_5$ used as binders.

DETAILED DESCRIPTION OF THE INVENTION

The present invention provides a CaSO$_4$ based TL detector, containing a phosphorous compound as a binder.

The present invention provides a method for fabricating a CaSO$_4$ based TL detector, comprising the steps of: mixing CaSO$_4$ based TL powder with a precursor of phosphorous compound; molding the mixture powder under pressure; and sintering the molded body.

As a rule, addition of a small amount of an activator to an insulating TL material results in the generation of electron traps. Once the TL material is irradiated with radiation and heated, trapped electrons are excited to a conduction band and recombined with holes that are recombination centers with the concomitant release of the energy as thermoluminescence.

In the present invention, CaSO$_4$ based TL materials are employed. Illustrative, but non-limiting examples of activators added in small amounts include manganese (Mn) and, rare-earth elements, such as dysprosium (Dy), thulium (Tm) and samarium (Sm) with preference to Dy. The activator is used in the amount of 0.01~5 mol % based on the amount of the TL materials in accordance with the present invention and preferably, in the amount of 0.1 mol %.

The present invention is featured in that while a CaSO$_4$ based TL material is processed into a TL detector, a phosphorous compound is used as a binder responsible of the solidification of the CaSO$_4$ based TL materials. Sourced from a phosphorus precursor, the phosphorous compound, which remains as a binder ultimately, is formed during the molding and sintering of a mixture of CaSO$_4$ based TL powder and the precursor. Examples of the precursor of phosphorous compound include NH$_4$H$_2$PO$_4$, (NH$_4$)$_2$HPO$_4$, H$_3$PO$_4$ and P$_2$O$_5$ with preference to NH$_4$H$_2$PO$_4$.

Depending on mechanical strength of TL detector, TL sensitivity, shape of TL detector, and pressing conditions, the addition amount of the phosphorus precursor ranges from 5 to 50 mol %, preferably from 10 to 30 mol % and most preferably from 10 to 20 mol %. Higher contents of the phosphorous compound provide larger mechanical strength to the TL detector. However, if the phosphorous compound is used beyond the above range, TL sensitivity is relatively decreased. More specifically, in the case of cold pressing during the molding under pressure, the phosphorous compound is preferably used in the amount of 10~30 mol %, in consideration of mechanical strength and TL sensitivity. An amount of the phosphorous compound less than 10 mol % gives rise to a drastic decrease in the mechanical strength, whereas an amount exceeding 30 mol % results in deformation of the TL detector. On the other hand, in the case of hot pressing, deformation of the TL detector can be minimized, which allows the phosphorous compound to be used in the amount of 10~50 mol %.

As will be described, in detail, in the following Example 1, a TL detector mixed with the phosphorous compound is similar to a TL powder in terms of TL curve shape and TL sensitivity. These results indicate that the addition of phosphorous compound has no significant influence on the sensitivity of the TL detector.

In accordance with the present invention, the TL detector is fabricated by (a) mixing $CaSO_4$ based TL powder with a precursor of phosphorous compound; (b) molding the mixture powder under pressure; and (c) sintering the molded body.

Figure 1:
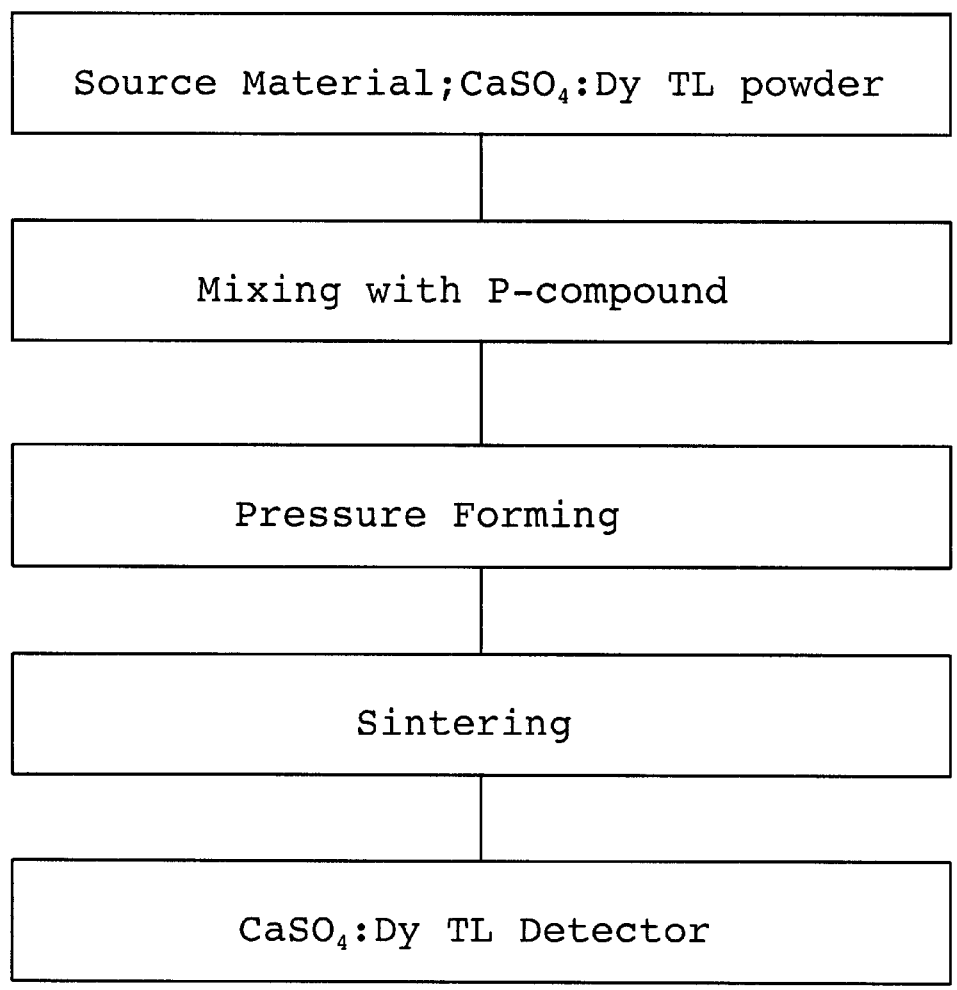
FIG. 1 shows a schematic diagram of a method for fabricating CaSO$_4$:Dy TL detectors bonded with phosphorous compound of the present invention.

With reference to FIG. 1, there is schematically illustrated a method for fabricating the TL detector.

In the mixing step, a $CaSO_4$ based TL powder is mixed with the precursor solution of phosphorous compound in predetermined molar ratios, slowly dried at room temperature, and ground into powder.

The molding step is carried out by cold or hot pressing under pressure to obtain a molded powder body. The pressure suitable for this molding step is in the order of 100~300 Mpa, which gives assurance that the molded powder body is not broken in the following sintering step.

As mentioned above, the amount of phosphorous compound can be adjusted according to the molding manners. In general, when hot pressing is carried out after cold pressing, the amount of phosphorous compound used may be up to 50 mol %.

TL detectors can be fabricated in a desired form by using various forms of molds. In this regard, illustrative, but non-limiting examples of shape of the molds include a disc type, a square chip type, or a rod type. The detector can be fabricated in various sizes and forms according to its purposes. For instance, disc type or square chip type is used for TLD badge, and rod type is applied for radiation simulation equipment.

After the molding step, the aggregation of the molded powder body is maintained by temporary physical force. However, binding force among powder is so small that the molded body cannot sustain its molded shape for a long time period. If the molded body is left as it is, its microscopic structure is deformed, which results in the loss of the original TL properties. For these reasons, the sintering step is needed. In accordance with the present invention, the molded body is sintered at 500 to 700° C. for 20 minutes to 3 hours and preferably at 550 to 650° C. for 25 minutes to 1 hour. After the sintering, the TL detector thus obtained has high mechanical strength, as well as exhibiting the TL characteristics similar to those of the TL powder.

Through the sintering step, the phosphorous compound, $P_2O_5$, is combined with CaO of $CaSO_4$ to form $CaO.P_2O_5$, which acts actually as a binder in the molded body, allowing the production of hard solid TL detectors.

Figure 2:
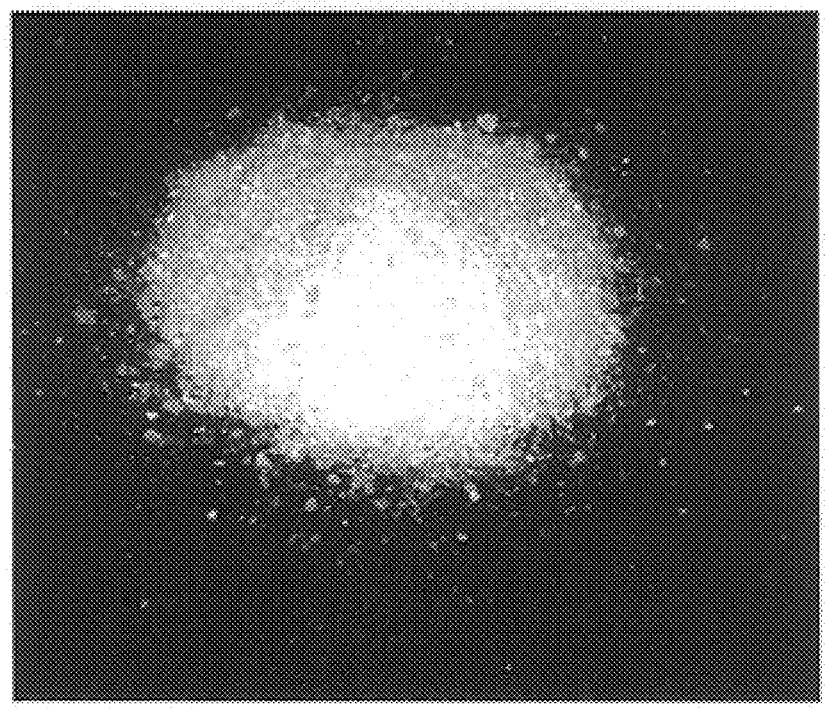
FIG. 2. are photographs showing CaSO$_4$:Dy TL powder prepared in Example 1 (a) and the CaSO$_4$:Dy TL detector of the present invention (b).
Figure 2:
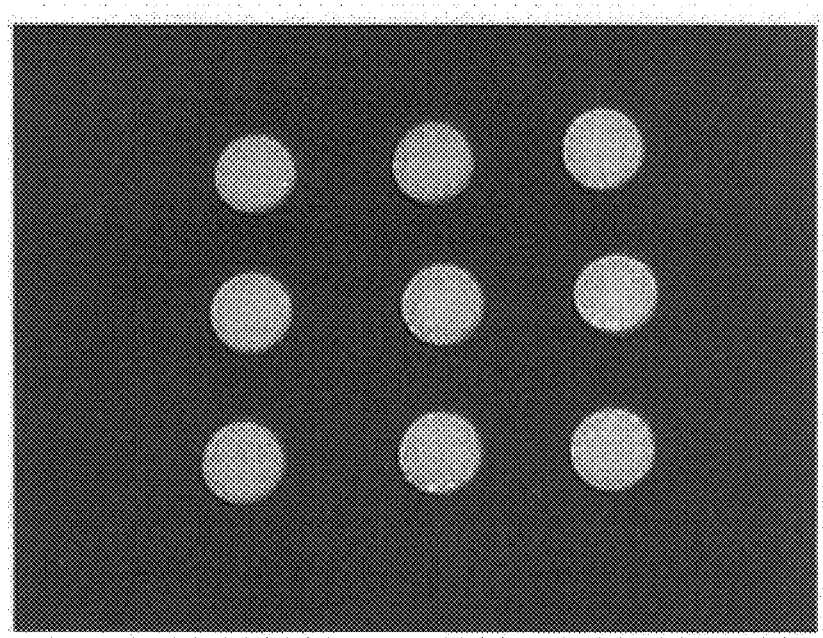

With reference to FIGS. 2a and 2b, there are shown photographs of TL powder and a TL detector, respectively. As seen in these figures, TL powder can be formed into a solidified disc type TL detector according to the method of the present invention.

The TL detector fabricated according to the present invention retains almost the same TL properties as those of TL powder (FIG. 4) and has TL sensitivity 6 times higher than that of commercially available Teflon pellet (Table 1 and FIG. 6), as will be described in detail in the following examples. In addition to having excellent TL property, the TL detector of the present invention exhibits very low LLD (lowest limit detection) such that it can be used for environmental monitoring.

Figure 8:
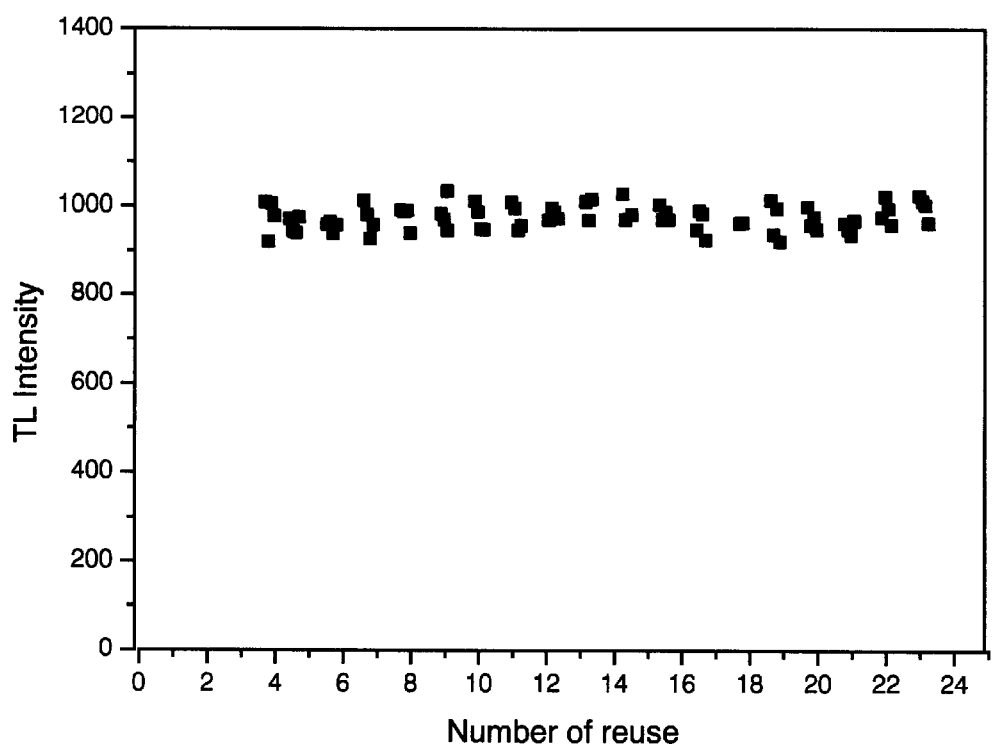
FIG. 8 shows a graph of TL intensity upon reuse of the TL detector of the present invention.

Furthermore, the TL detector has superior energy dependence (FIG. 9) and dose dependence (FIG. 10), and can be reused by virtue of its relatively steady TL sensitivity even after 20 or higher repetition cycles (FIG. 8).

A better understanding of the present invention may be obtained in light of the following examples which are set forth to illustrate, but are not to be construed to limit the present invention.

EXAMPLE 1

Preparation of $CaSO_4$:Dy TL Detector Bonded with $NH_4H_2PO_4$ as Phosphorous Precursor A disc type TL detector was fabricated as follows:
(a) Preparing Step of TL Powders $CaSO_4$:Dy TL powders were prepared according to a method of Yamashita [T. Yamashita, N. Nada, H. Onishi and S. Kitamura, Calcium sulphate activated bythulium or dysprosium for thermoluminescence dosimetry, *Health Phys.* 1971, 21, 295–300].

$Dy_2O_3$ (0.0373 g) as an activator was dissolved in a dilute aq. solution of sulfuric acid (10 ml) and poured into a concentrated sulfuric acid-containing flask, followed by the addition of $Ca(NO_3)_2.4H_2O$ (23.625 g). The reaction mixture was heated at 320° C., the conc. $H_2SO_4$ was distilled over, and thereby crystalline $CaSO_4$:Dy was formed on the inner wall of the flask. After being separated from the wall, the crystals were washed several times with distilled water and ground into powders of homogenous grain sizes. The powders were sintered at 700° C. for 1 hour to yield $CaSO_4$:Dy TL powders (CaO: 45.08±4.51, $SO_3$: 58.65±5.87, $Dy_2O_3$: 0.27±0.03, unit: wt %).
(b) Mixing Step $CaSO_4$:Dy TL powders obtained in the previous step were added with aq. $NH_4H_2PO_4$ solution in various molar ratios of 5, 10, 15, 20 and 30 mol % and uniformly mixed.
(c) Molding Step TL powders mixed with the above phosphorous precursor were introduced into a disc type mold of 4.5 mm diameter, and formed under a pressure of 20.0 Mpa to give a disc type molded body (diameter: 4.5 mm, thickness: 0.8 mm). In this regard, a specialized automatic press was used.
(d) Sintering Step The disc type molded body was sintered at 600° C. for 30 minutes to yield a disc type $CaSO_4$:Dy TL detector.

EXAMPLE 2

TL Characteristics of $CaSO_4$:Dy TL Detector Bonded with Phosphorous Compound

To assay the characteristics of TL detector fabricated in the above example 1, the TL detector was irradiated with $^{137}Cs$ γ ray from the Korea Atomic Energy Research Institute, followed by measuring TL response by use of a TLb reader (Teledyne system 310, USA) and analyzing TL sensitivity to radiation. 1. TL Sensitivity (a) TL Sensitivity of TL Powder $CaSO_4$:Dy TL powder prepared in the above example 1 and commercially available $CaSO_4$:Dy TL powder (Teledyne, USA) were measured for their TL sensitivity. The results are shown in FIG. 3.

Figure 3:
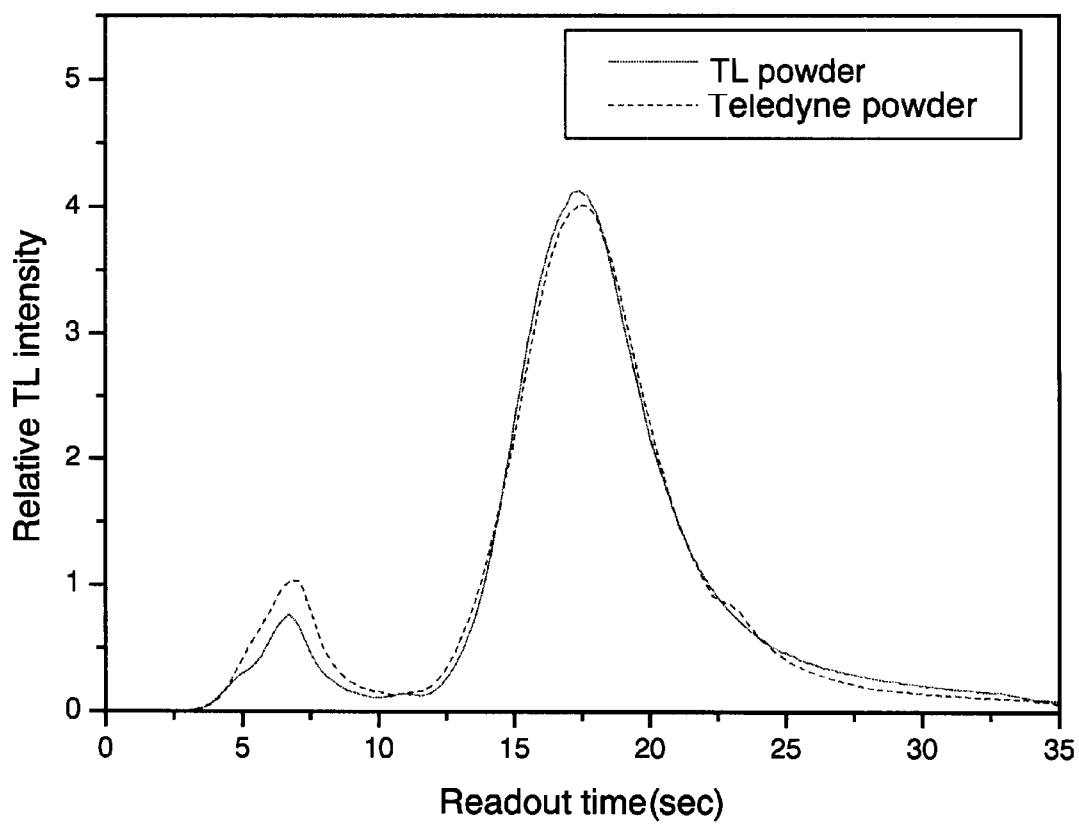
FIG. 3 is curves showing the TL intensity of CaSO$_4$:Dy TL powder prepared in the present invention (—)and commercially available CaSO$_4$:Dy TL powder of Teledyne$^R$ ( - - - )

As can be seen in FIG. 3, TL intensity of $CaSO_4$:Dy TL powder of the present invention was found to be equal to or better than that of Teledyne powder.

(b) TL Sensitivity of TL powder and TL Detector

To investigate the effect of the binder on TL sensitivity, $CaSO_4$:Dy TL powder and TL detector (phosphorous compound: 10 mol %) were measured for their TL sensitivity. The results are shown in FIG. 4.

Figure 4:
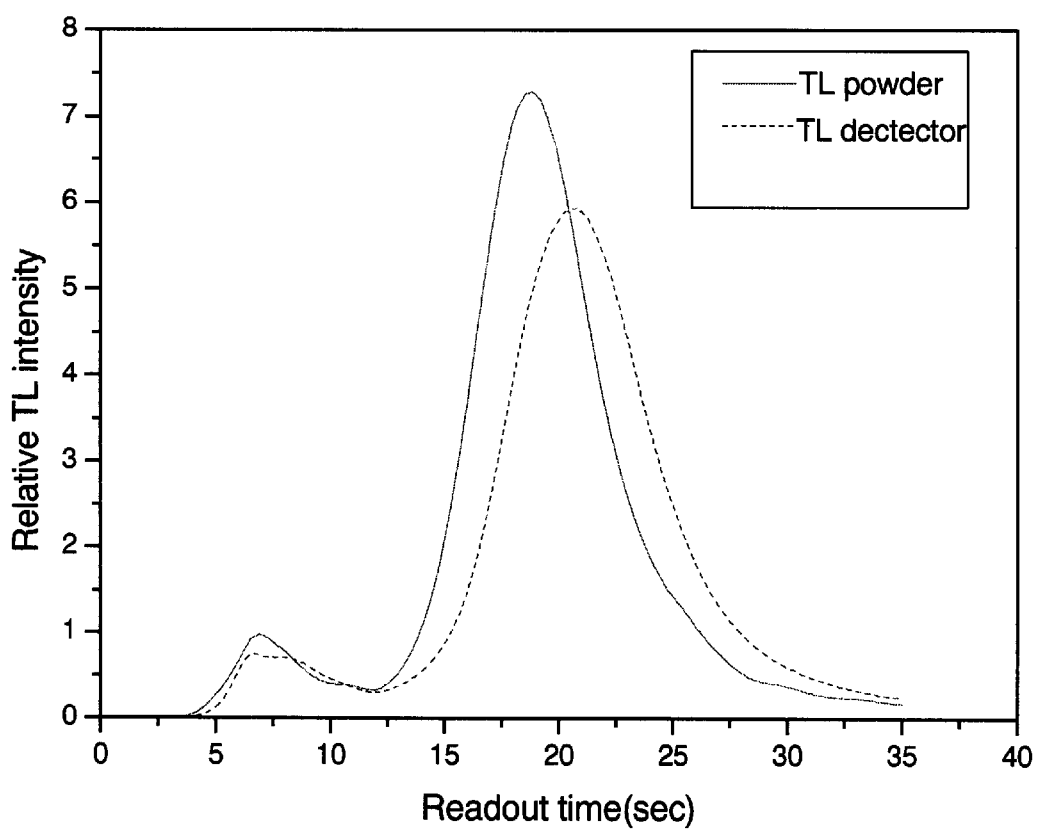
FIG. 4 is curves showing the TL intensity of TL powder prepared in the present invention (—) and the TL detector fabricated from the powder according to the present invention ( - - - ).

As seen in FIG. 4, TL intensity of the $CaSO_4$:Dy TL detector corresponds to 90% of TL intensity of the prepared $CaSO_4$:Dy TL powders. From this result, it is confirmed that TL sensitivity of the TL detector is not drastically decreased by the phosphorous compound, which is used as the binder upon preparation of TL detector.

(c) TL Sensitivity Varying with Contents of Phosphorous Compound

To investigate the effect of the contents of phosphrous compound on TL sensitivity, TL sensitivity of the $CaSO_4$:Dy TL detector (P-compound: 10, 20 and 30 mol %) fabricated in Example 1 was measured. The results are given in FIG. 5.

Figure 5:
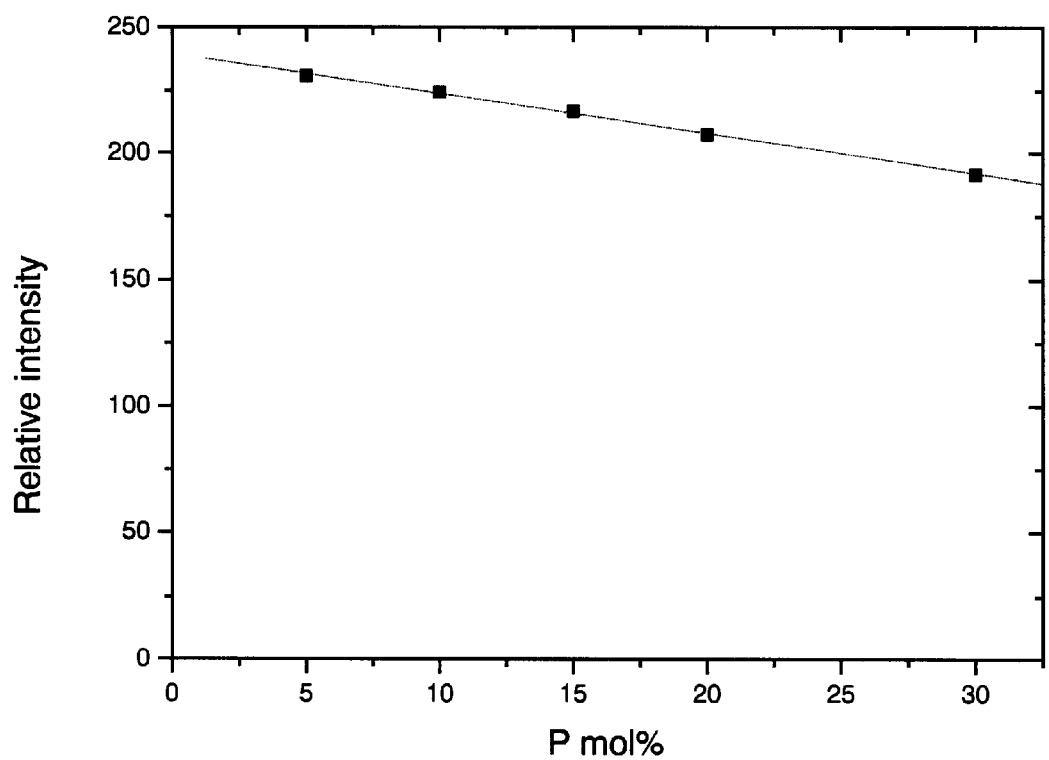
FIG. 5 is a linear curve illustrating intensity change of CaSO$_4$:Dy TL detector according to the contents of phosphorous compound.

As shown in FIG. 5, TL intensity tends to slightly decrease with the increase in content of the phosphorous compound. Therefore, it can be seen that the most preferable amount of the phosphorous compound falls into the range of 10 to 20 mol %.

(d) Sensitivity of TL Detector and Commercially Available Teflon Pellet

An measurement was made of the TL sensitivity of the CaSO4:Dy TL detector (P-compound: 10 mol %) fabricated in Example 1 and a commercially available $CaSO_4$:Dy Teflon pellet (Teledyne, USA). The results are presented in Table 1, below and FIG. 6.

TABLE 1

| TL material | Relative TL Sensitivity |
| --- | --- |
| $CaSO_4$:Dy TL Detector of Ex. 1 | 6.3 |
| Teledyne $CaSO_4$:Dy Teflon pellet | 1.0 |

Figure 6:
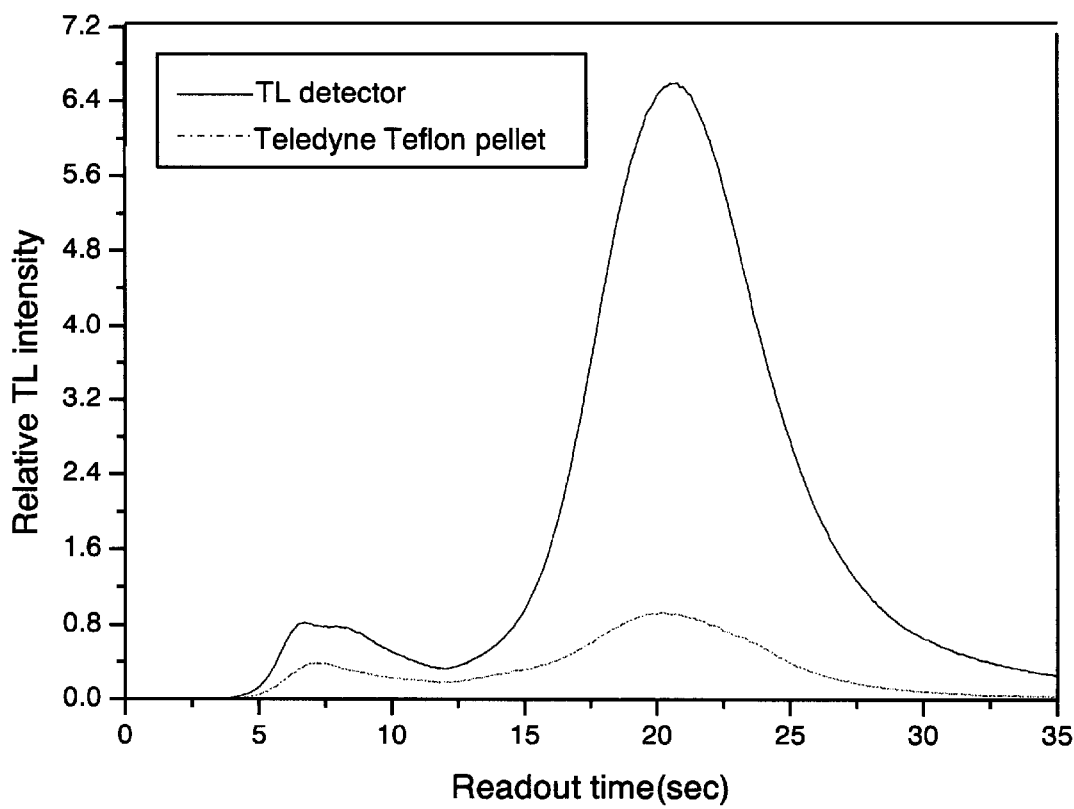
FIG. 6 is curves illustrating TL intensity of the CaSO$_4$:Dy TL detector (—) of the present invention and commercially available CaSO$_4$:Dy Teflon pellet of Teledyne$^R$ ( - - - ).

As seen in Table 1 and FIG. 6, the TL detector of the present invention has TL fabricated 6 times higher than that of Teflon pellet supplied from Teledyne. Hence, the detector of the present invention has higher TL sensitivity than any commercially available $CaSO_4$:Dy TL detector. Further, the detector of the present invention was measured to give higher accuracy even in a low detection range. 2. Lowest Limit of Detection (LLD)

The lowest limit of detection of the TL detector of the present invention was determined by calculating a standard deviation $\sigma_0$ from the measured values which were obtained by ten repetitions of a zero dose experiment, and multiplying it by 3. As the calculated result, the LLD was found to be 0.6 $\mu$Gy.

Figure 7:
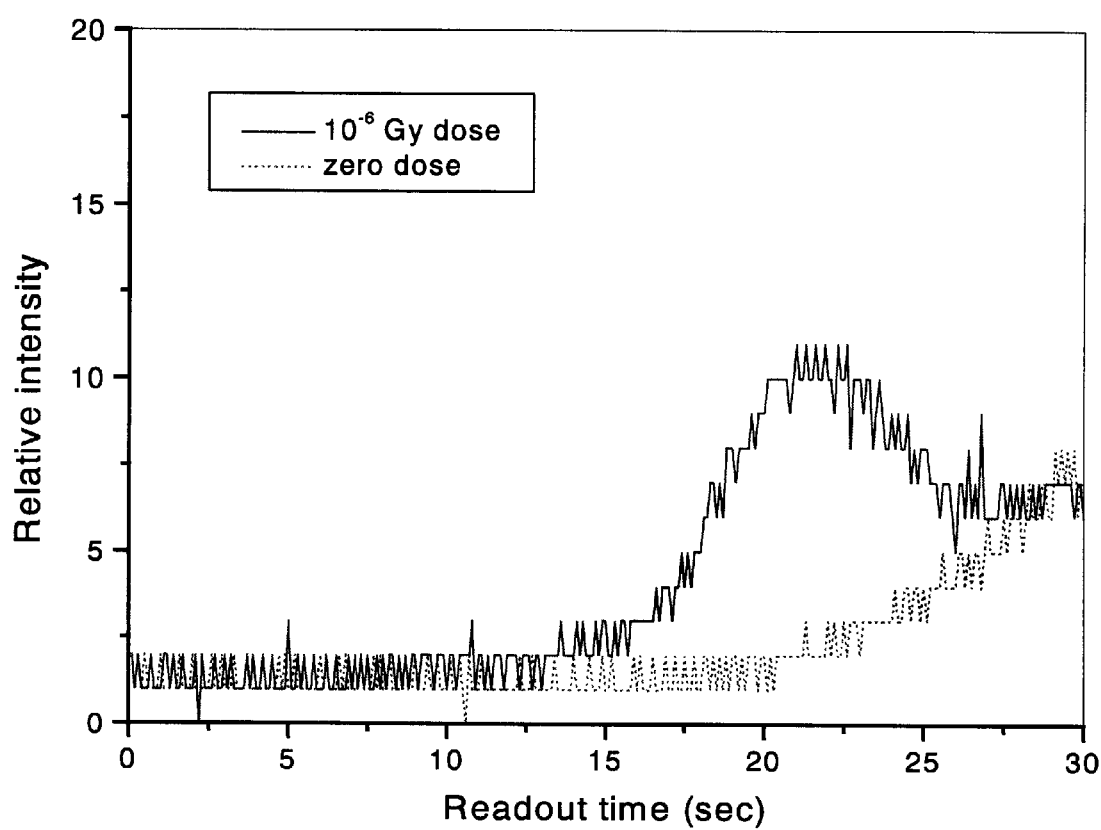
FIG. 7 is TL curves of the CaSO$_4$:Dy TL detector of the present invention upon irradiation of 1 μGy dose (—) and zero dose ( - - - ).

As apparent in FIG. 7, the TL curve upon 1 $\mu$Gy dose irradiation appears in a quite different pattern from the TL curve of zero dose. With such excellent LLD, therefore, the TL detector of the present invention can accurately measure low dose radiation with effectiveness. 3. Reusability The following experiment was conducted to determine whether the TL detector of the present invention can be repeatedly used.

The procedure of irradiating the $CaSO_4$:Dy TL detector fabricated in Example 1 with radiation and reading the TL intensity from the detector was repeated 20 times. The results are given in FIG. 8.

As can be shown in FIG. 8, the TL detector of the present invention shows excellent reusability because its TL intensity does not significantly change even after 20 assay cycles.
4. Energy Dependence The energy dependence according to the amounts of phosphorous compound was tested by use of the TL detectors prepared in Example 1. The results are given in FIG. 9.

Figure 9:
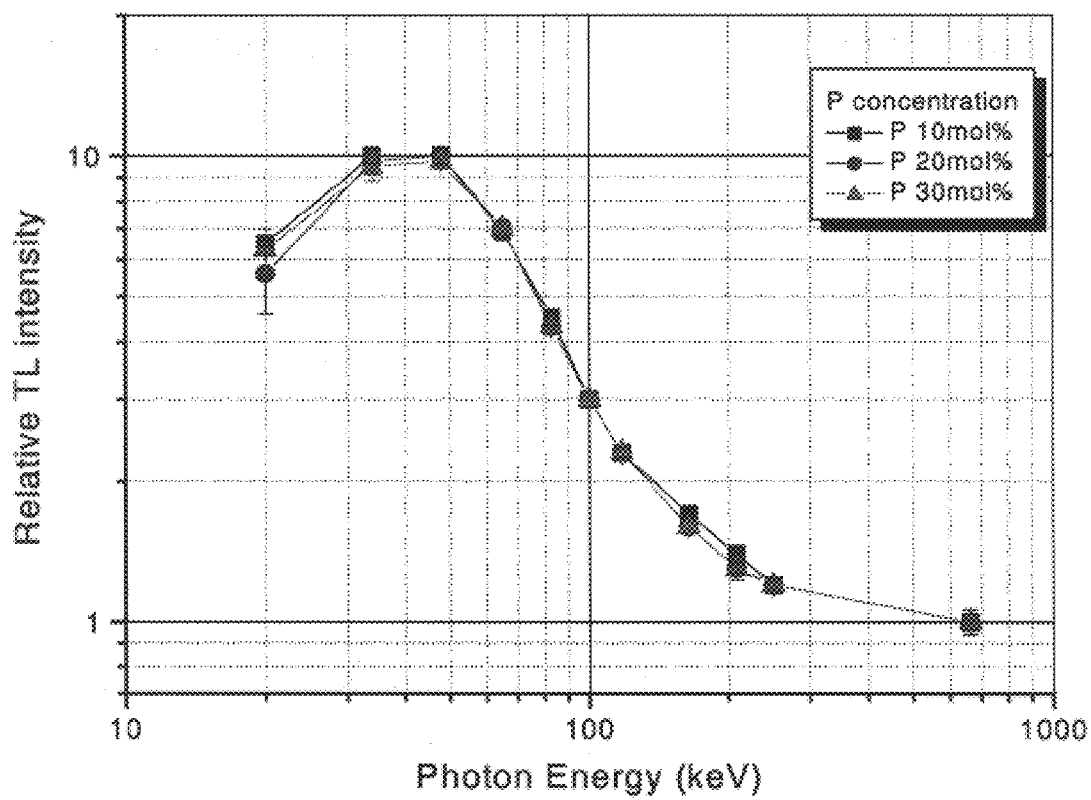
FIG. 9 shows a graph illustrating energy dependence on phosphorous amounts in the TL detector of the present invention.

As shown in FIG. 9, similar curves were plotted by TL intensity versus energy for amounts of phosphorous compounds of 10, 20 and 30 mol %. In addition, the TL powder was also measured to show the same energy dependence as in the TL detector.

Also, when photon energy was 200 keV or less, relative energy response (RER) had high values with the maximum of 10 at 30~40 keV. 5. Dose Dependence By measuring absorbed doses of TL detector, TL powder of the present invention and Teflon pellet, their dose dependence was ascertained.

After being irradiated in the range of $10^{-5}$ to $10^{-3}$ Gy, the $CaSO_4$:Dy. TL detector and $CaSO_4$:Dy TL powder prepared in Example 1, and commercially available $CaSO_4$:Dy Teflon pellet were measured for absorbed doses. The results are shown in FIG. 10.

As can be seen in FIG. 10, the TL detector of the present invention shows linearity in the range of $10^{-5}$ to 10 Gy with supralinearity in the range of 10 to $10^3$ Gy. The TL powder and the Teflon pellet were found to show patterns similar to that of the TL detector of the present invention. However, in terms of supralinearity factor, the TL detector of the present invention (f(D) 1.8); is superior to the Teflon pellet (f(D) 2.6) and TL powders (f(D) 2.8).

EXAMPLE 3

TL detectors were fabricated in the same manner as in Example 1, except that $CaSO_4$:Dy TL powder was added with $(NH_4)_2HPO_4$, $H_3PO_4$ and $P_2O_5$ as binders, instead of $NH_4H_2PO_4$. They were found to have TL sensitivity similar to that of the TL detector of Example 1. The TL properties when $P_2O_5$ was used as a binder are shown in FIG. 11. As apparent from the curves of FIG. 11, the relative TL intensity of the detector mixed with $P_2O_5$ is similar to that of the TL detector of the Example 1.

EXAMPLE 4

An experiment was carried out to determine whether a phosphorous compound acts as a binder.

The $CaSO_4$ having no activators was added with a phosphorous compound ($NH_4H_2PO_4$, 10 mol %) and used to prepare a detector according to the same manner as described above. The detector was measured to have mechanical strength similar to that of the TL detector of Example 1.

In the present invention, the TL detectors using phosphorous compound as the binder have six times higher TL sensitivity, compared with that of conventional Teflon pellet, and thus can be effectively used in measuring low dose.

The TL detector of the present invention can be used as an element whose assemblage constitutes a personnel dosimeter badge for monitoring personnel radiation dose equivalent.

Additionally, the TL detector of the present invention can be used to measure exposure doses of the patents who are under radiotherapy or radiodiagnosis. For example, the TL detector is attached to inside or outside of radiation exposure simulation equipment (phantom) and exposed to radiation. Measurement of the TL sensitivity of the detector allows the absorbed dose of the human body at a detector-attached point to be known.

By periodically measuring TL sensitivity of the TL detector positioned at an atomic power plant or radiation exposure zone, the detector can be beneficially applied to the field of environmental monitoring.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed:

1. A $CaSO_4$ based TL detector comprising a $CaSO_4$ based TL material and a binder, wherein the binder is a phosphorous compound.

2. The $CaSO_4$ based TL detector according to claim 1, wherein a precursor of the phosphorous compound is selected from the group consisting of $NH_4H_2PO_4$, $(NH_4)_2HPO_4$, $H_3PO_4$ and $P_2O_5$.

3. The $CaSO_4$ based TL detector according to claim 2, wherein the precursor of the phosphorous compound is $NH_4H_2PO_4$.

4. The $CaSO_4$ based TL detector according to claim 1, wherein the phosphorous compound is used in the amount of 10~50 mol %, on the basis of the total amount of $CaSO_4$ based TL detector.

5. The $CaSO_4$ based TL detector according to claim 1, wherein an activator contained in the $CaSO_4$ based TL detector is selected from the group consisting of Mn, Dy, Tm and Sm.

6. The $CaSO_4$ based TL detector according to claim 1, wherein the $CaSO_4$ based TL material is $CaSO_4$:Dy.

7. The $CaSO_4$ based TL detector according to claim 1, wherein the $CaSO_4$ based TL detector is in the form of a disc, a rod or a square chip.

8. A method for fabricating $CaSO_4$ based TL detectors according to claim 1, comprising the steps of:
    (a) mixing $CaSO_4$ based TL powder with a precursor of phosphorous compound;
    (b) molding the mixture powder under pressure; and
    (c) sintering the molded body.

9. The method according to claim 8, wherein the molding step is carried out under a pressure of 100~300 MPa, and the sintering step is performed at 500~700° C.

* * * * *